United States Patent [19]

Bredoux et al.

[11] 3,735,135

[45] May 22, 1973

[54] NEUTRON DETECTOR OF THE TRACK-DAMAGE TYPE

[75] Inventors: Francois Jean-Marie Bredoux, Vincennes; Claude Andre Mercier, Fontenay sous Bois; Georges Achille Phlipot, Paris, all of France

[73] Assignee: Eastman Kodak Company, Rochester, N.Y.

[22] Filed: Oct. 2, 1970

[21] Appl. No.: 77,727

[30] Foreign Application Priority Data

Nov. 4, 1969 France...............................6937866

[52] U.S. Cl..............................250/83.1, 250/83 CD
[51] Int. Cl................................G01t 5/00, G01t 3/00
[58] Field of Search.........................250/83 CD, 83.1

[56] References Cited

UNITED STATES PATENTS

| | | |
|---|---|---|
| 3,457,408 | 7/1969 | Alter....................................250/83.1 |
| 3,548,191 | 12/1970 | Schultz et al........................250/83.1 |

Primary Examiner—Archie R. Borchelt
Attorney—W. H. J. Kline, B. D. Wiese and M. B. Kurtzman

[57] ABSTRACT

A neutrographic product comprising a recorder layer capable of undergoing selective radiation-damage and a converter layer comprising a composition dispersed in a binder, said composition being capable of producing a nuclear (n, alpha) reaction.

10 Claims, No Drawings

NEUTRON DETECTOR OF THE TRACK-DAMAGE TYPE

BACKGROUND OF THE INVENTION

Field of the Invention

This invention relates to the detection of neutrons by means of recording tracks that are formed in a radiation-degradable solid medium by a secondary emission of ionizing particles. The invention especially relates to a product that makes it possible to record the tracks that are obtained when one exposes a solid to a source of neutrons, as well as to a neutrography process, that is to say, to a process which makes possible the recording of tracks produced indirectly by the neutrons in a sensitive product.

It is known that it is possible to obtain information with respect to the inner structure of materials by exposing said materials to a flux of neutrons. In order to accomplish this, one exposes the materials to slow neutrons such as thermal neutrons or, preferably, cold neutrons. The thusly examined material modulates the flux of neutrons and this modulated flux is caused to act upon a converter medium where it is transformed into ionizing particles which in turn produce local sites of radiation-damage in a recording medium. The sites of radiation-damage may then be made visible by means of selective chemical etching after which the recording medium can be examined microscopically. Such a neutrographic process must have as an essential quality the production of excellent contrast between the etched areas and the undamaged areas of the recording medium.

Most of the neutrographic processes call for the use of a recording medium and a separate converter medium; the role of which is to transform the neutrons into alpha particles. Such a converter is usually a substance which undergoes a nuclear ($n$, alpha) reaction and it is the alpha particles that produces selectively radiation damage in certain substances which are, moreover, insensitive to electromagnetic radiations, in particular X or gamma rays. Such substances which can be selectively etched are, for example, polymeric materials such as cellulose nitrate, cellulose acetate, cellulose acetobutyrate or polycarbonates and non-polymeric materials such as certain micas.

Various neutrography processes have already been proposed; the one described in French Pat. No. 1,555,688 consists, according to one its embodiments, in converting the neutrons into alpha particles and fission fragments by means of an enriched uranium foil, the alpha particles are then caused to act on a product comprising a surface layer of radiation sensitive plastic material and a subjacent layer consisting of a silver halide photosensitive emulsion. The areas irradiated by the ionizing particles, such as the alpha particles, experience a change in their chemical properties so that one may remove them by etching with a suitable corrosive agent such as caustic soda. If the photographic emulsion is then exposed through the surface layer, and one develops it, a photographic image is obtained that corresponds to the areas irradiated by the ionizing particles.

Such a process appears rather complicated and the obtained images often display a substantial degree of low-image density as a result of a sizeable diffusion of the nuclear particles. Further, the uranium, even without excitation, continuously emits alpha particles which cause an undesirable back-ground fogging. Finally, the fission of the uranium by the nuclear particles liberates radioactive compounds the presence of which may be disturbing.

Another device for the detection of traces produced by nuclear particles and described in French Pat. No. 1,527,114, consists in impinging a neutron flux on a product comprising a boron surface layer enriched in its isotope 10 and a subjacent layer of cellulose nitrate. The boron, enriched in its isotope 10, converts the neutrons into alpha particles which cause radiation-damage of the cellulose nitrate layer, which damaged tracks may, after the chemical etching, be observed through an optical microscope.

The process requires compacting boron powder on a cellulose nitrate sheet. Boron is a substance of great hardness and the very abrasive boron powder can cause scratches on the cellulose nitrate sheet which, during chemical etching, will produce tracks that cannot be distinguished from those produced by the nuclear particles. Moreover, taking once more into consideration the hardness of boron, breaking it down into powder is a delicate operation.

SUMMARY OF THE INVENTION

The product, according to the invention comprises (1) a first layer, called the converter layer, containing an active compound at least one component of which is an element capable of producing a nuclear reaction of the ($n$, alpha) type, and (2) a second layer adjacent to the converter layer, of a substance making possible the recording of the alpha particles. The first layer is characterized in that the active compound of said converter layer is dispersed in a binder, and the converter layer is in close contact with said second layer.

The product is employed, in general, where it is desired to monitor and record a flux of neutrons such as in non-destructive examinations of solid materials.

It is accordingly an object of the invention to provide a new and improved process for the detection and recording of a neutron flux.

It is another object to provide a process for the detection of neutrons through the recordation of charged particles.

It is still a further object to provide a process for the detection of neutrons through the recordation of alpha-particles.

It is still another object of the invention to provide a process and product by which radiation-damage can be readily evaluated.

It is still another object to provide a product which is capable of detecting high energy particles.

It is another object to provide a product which is capable of detecting and recording neutrons and alpha-particles.

DESCRIPTION OF THE PREFERRED EMBODIMENTS

In accordance with the invention, there is provided a neutrographic product comprising (1) a first layer, called a converter layer, comprising at least one component which contains an element capable of undergoing the nuclear ($n$, alpha) reaction, said component being dispersed in a binder and, (2) a second layer immediately adjacent to said converter layer, said second layer being capable of forming local sites of radiation-damage.

It has been discovered that the product of this invention has the advantages among others of permitting a reduction to neutron exposure of the materials being studied, providing an image of increased density and contrast and the elimination of scratches upon the recording sheet. The advantages are moreover obtained independently of each other.

Among the active converter compounds, the components of which may produce a nuclear reaction of the ($n$,alpha) type, one may cite the compounds of boron-10 such as borates, lithium-6 salts such as lithium halides and, of course, the compounds containing, simultaneously, boron-10 and lithium-6 such as lithium borates.

Lithium borate has already been employed as a converter agent ($n$, alpha) for sensitizing silver halide emulsions to neutrons, but the products obtained do not display the same selectivity for the various ionizing radiations as the product according to the invention. Furthermore, various activated lithium salts have been employed for producing dosimeters which make possible the recording of tracks that are produced by ionizing particles.

By employing a converter layer containing a compound such as lithium borate or lithium fluoride, dispersed in a binder in combination with a layer of a substance sensitive to alpha particles, such as cellulose nitrate, the action of the alpha particles on the nitrocellulose is particularly reinforced. After treatment of the cellulose nitrate layer, a negative is obtained which is a good-contrast neutrographic image.

Thus, in accordance with the invention, there is provided a neutrographic product comprising a converter layer which comprises a dispersion of lithium borate or another lithium salt such as lithium fluoride in a binder, said recording layer being placed immediately adjacent to the $\alpha$-particles sensitive layer. The dispersion of converter materials in a binder makes it possible to effect an excellent contact between the converter layer and the subjacent recording layer, and consequently, the diffusion of ionizing particles is greatly reduced, which in the end improves the quality of the obtained image. This close contact between the two surfaces prevents the deposit of dust particles by undesirable electrostatic phenomena; the dust particles would easily stop the alpha radiation and would affect the definition of the obtained image. It is to be noted that such a close contact between the two layers, converter and recorder, is practically impossible to effect with boron powder unless a large quantity of binder is used; however, in this case substantially thick layer would be required and causes internal absorption of a large proportion of the alpha radiation that is formed, thereby substantially seriously reducing the efficiency of the system.

In a preferred embodiment the converter layer comprising at least one compound dispersed in a binder is coated on the recorder layer thereby providing extremely close contact between the two layers.

One may, according to the invention, use any variety whatsoever of borate with lithium borate being preferred, provided the alkalinity of the selected salt is not so excessive that it decomposes the subjacent recording layer, particularly if the latter consists of a cellulose ester such as cellulose nitrate. The lithium borates that are prepared from naturally occurring compounds such as borax, comprise boron which is in fact a mixture of isotopes-10 and -11 with a ratio of boron-10 of approximately 188/1,000 and lithium, which is a mixture of its isotopes-6 and -7, the second being approximately 12 times as abundant as the first. The usage of a lithium borate prepared from natural compounds makes it possible to keep the cost of materials relatively low and yet produce a product which yields excellent results. A higher effectiveness can be obtained by using a lithium borate enriched with lithium-6 or with boron-10, or with both these isotopes simultaneously.

The neutrographic process according to the invention consists in exposing a product, such as the one described above, to a flux of neutrons modulated by an object, in removing then the converter layer and in treating the subjacent layer, consisting, e.g., of cellulose nitrate, with a chemical agent with the view of altering selectively the irradiated areas, which makes it possible to form on this cellulose nitrate layer a neutrographic image of the object that is exposed to the flux of neutrons.

In order to effect this exposure to the flux of neutrons, one may use a nuclear reactor, e.g., a pool reactor. It is particularly noteworthy that the duration of irradiation required by the product of the invention is much lower than the periods of duration that are required by the products of the prior art.

As has been indicated above, a binder is used for dispersing the active compound in the converter layer. Since it is preferable, for reasons of convenience, that the converter layer be removable with water, it is desirable to employ a binder that is soluble in either cold or lukewarm water, e.g., gelatin or suitable vinyl polymers, such as polYvinylpyrrolidone, or cellulosic binders. The concentration of active substance employed in the converter layer can vary widely. The concentration can vary according to the nature of the active substance and the nature of the binder in which the active substance is dispersed. In the case of lithium borate, the concentration employed can vary from about 50 to 97 percent of the total weight of film forming composition that is used to form the converter layer.

In an embodiment of this invention the recording layer can be coated on a support. Typical supports include poly(ethylene terephthalate) film, polycarbonate film, poly(vinylacetal) film support, polystyrene film and the like.

In the preferred embodiment of the invention the converter layer comprising a compound dispersed in a binder is coated directly upon the recording layer in order to effect the closest contact possible thereby permitting the greatest realization of the advantages of the invention as described hereinabove.

Alkaline aqueous solutions can be employed in the process of altering selectively the irradiated areas of the recorder layer thereby producing a visible image. A typical method of producing a visible image is described by R. L. Fleischer et al in "Physical Review" (S.A.) 133, pages 1,443–1,449 (Mar. 2, 1964). In examining the film by transmission, using polarized light, one can count the traces. A method employed advantageously with reference to the invention consists in treating the subjacent layer according to the process described in French Pat. No. 1,563,973. According to the latter process, one exposes a layer of a substance such as cellulose nitrate, initially transparent, to a flux of appropriate ionizing particles, this layer is then treated with an alkaline solution containing, preferably, a swelling agent for cellulose nitrate, which makes it possible to deepen the etched tracks that are produced by the ionizing particles, but at the same time can also mottle the non-irradiated areas. In a second operation, effected by means of another alkaline solution containing a dissolving agent for the attacked areas, the surface of the layer is chemically polished by dissolving the fraction of the thickness that is attacked and mottled by the first treatment: the non-irradiated areas recover their initial transparency while the irradiated areas, more deeply attacked, remain visible. In the case of cellulose nitrate, one may select as a swelling agent a halide or a thiocyanate of alkaline metal, and as solvent agent, ethyleneglycol.

This invention can be further illustrated by the following examples of preferred embodiments thereof, although it will be understood that these examples are included merely for illustrating this invention.

Example 1

In a porcelain jar provided with porcelain balls, there is introduced the following mixture:

| | |
|---|---|
| Lithium metaborate (2H$_2$O) | 25 g |
| Water | 70 ml |

The jar is rotated so as to homogenize the mixture. Upon homogenization there is added a solution of 7 g. of gelatin in 70 ml. of water. The mixture is brought up to 50°C and is stirred so as to homogenize it. The mixture is applied to a film of camphor-plasticized cellulose nitrate. The thickness of the converter layer after drying is several microns. This product is used for receiving a flux of neutrons modulated by a uranium bar that is interposed between the source of neutrons and said product. After irradiation, the converter layer containing the gelatin and lithium borate is removed by washing with lukewarm water, and the recorder layer is treated according to the process described in French Pat. No. 1,563,973. After treatment, one obtains an intense image and which reproduces the very fine details with sharpness.

Example 2

A gelatin layer, several microns thick, is deposited on an alpha particle-sensitive cellulose nitrate film. The gelatin layer is then dried and immersed in a saturated solution of lithium tetraborate Li$_2$B$_4$O$_7$· 5H$_2$O, having a temperature below 30°C. The coated layer is removed from the solution and dried again. The coated product is employed under the same condition of Example 1. A good quality image is obtained.

Example 3

There is introduced in a porcelain jar provided with porcelain balls:

| | |
|---|---|
| Lithium borate | 80 g |
| Ethanol | 72 ml |
| Water | 70 ml |

The mixture is ground for 18 hours. There is added a collodion prepared by dissolving 6 g. of high-viscosity polyvinylpyrrolidone in 70 ml of water. The mixture is ground for another 4 hours.

The creamy product obtained is spread on a cellulose nitrate film in the amount of 0.5 g/dm$^2$. This film is employed as in Example 1. A good quality image is obtained.

Example 4

This example illustrates a variation in process of preparing the neutrographic product, which variation consists in applying in the form of a layer a dispersion in a binder of an active compound capable of producing the nuclear ($n$, alpha) reaction to a support, then placing the obtained converter product in contact with the cellulose nitrate recording layer. This alternative of embodiment proves, however, to be less advantageous because it does not make it possible to effect a contact that is as close as that effected with the products described in Examples 1 to 3.

There is introduced in a porcelain jar provided with porcelain balls, the following mixture:

| | |
|---|---|
| Sodium metaborate (2H$_2$O) | 30 g |
| Styrene-butadiene binder | 15 g |
| Toluene | 80 ml |

The jar is rotated for about 10 hours. Thereafter the dispersion is spread on a 35-micron poly-(ethyleneglycol terephthalate) film so as to obtain a dry thickness of approximately 30 microns.

The lithium borate layer is placed in contact with an alpha particle sensitive film, consisting of a cellulose nitrate layer plasticized with camphor and deposited on an poly(ethyleneglycol terephthalate) support. An uranium bar is exposed to neutrons as in Example 1. As a comparison, the uranium bar is irradiated in the absence of the borate layer. The image that is obtained on the irradiated film in the presence of the lithium borate layer is much more intense and richer in the details than the one that is on the irradiated film alone.

The invention has been described in detail with particular reference to preferred embodiments thereof, but it will be understood that variations and modifications can be effected within the spirit and scope of the invention.

We claim:

1. In a neutron particle detector comprising (1) a converter layer which contains a material which emits charged particles when irradiated with neutrons and (2) a recording layer which forms etchable radiation damage tracks as a result of irradiation by charged particles, the improvement wherein said converter layer consists essentially of said charged-particle-emitting material uniformly dispersed in a water-soluble binder and is coated directly onto said recording layer, whereby said converter layer and said recording layer together form an integral element for neutron particle detection.

2. A neutron particle detector as defined in claim 1 wherein said charged-particle-emitting material is a borate.

3. A neutron particle detector as defined in claim 1 wherein said charged-particle-emitting material is a lithium salt.

4. A neutron particle detector as defined in claim 1 wherein said charged-particle-emitting material is lithium fluoride.

5. A neutron particle detector as defined in claim 1 wherein said charged-particle-emitting material is lithium borate.

6. A neutron particle detector as defined in claim 1 wherein said recording layer is composed of a cellulose ester.

7. A neutron particle detector as defined in claim 1 wherein said recording layer is composed of cellulose nitrate.

8. A neutron particle detector as defined in claim 1 wherein said binder is gelatin.

9. A neutron particle detector as defined in claim 1 wherein said binder is a cellulose derivative.

10. A neutron particle detector as defined in claim 1 wherein said binder is polyvinylpyrrolidone.

* * * * *